United States Patent [19]

Nakagawa et al.

[11] 4,381,247

[45] Apr. 26, 1983

[54] ENZYME-CONTAINING BLEACHING COMPOSITION

[75] Inventors: Yunosuke Nakagawa, Soka; Shoichiro Aramatsu, Ichikawa, both of Japan

[73] Assignee: Kao Soap Co., Ltd., Tokyo, Japan

[21] Appl. No.: 313,129

[22] Filed: Oct. 20, 1981

[30] Foreign Application Priority Data

Oct. 24, 1980 [JP] Japan .................... 55/149138

[51] Int. Cl.$^3$ .................. C11D 7/10; C11D 7/18; C11D 7/42; D06L 3/16

[52] U.S. Cl. ...................... 252/95; 252/89.1; 252/99; 252/133; 252/174; 252/174.12; 252/174.19; 252/186.25; 252/DIG. 12; 435/188; 435/263

[58] Field of Search ............ 252/95, 102, 133, 174, 252/174.12, 174.19, 89.1, DIG. 12, 186.25; 435/188, 263

[56] References Cited

U.S. PATENT DOCUMENTS

| | | | |
|---|---|---|---|
| 3,096,251 | 7/1963 | Babson | 435/188 |
| 3,325,364 | 6/1967 | Merritt | 435/188 |
| 3,558,498 | 1/1971 | Eymery et al. | 252/174.12 |
| 3,579,454 | 5/1971 | Collier | 252/97 |
| 3,723,327 | 3/1973 | Van Kampen | 252/110 |
| 3,789,001 | 1/1974 | Painelli | 252/99 |
| 4,155,868 | 5/1979 | Kaplan | 252/95 |

Primary Examiner—Dennis L. Albrecht
Attorney, Agent, or Firm—Flynn, Thiel, Boutell & Tanis

[57] ABSTRACT

An enzyme-containing bleaching composition is disclosed containing an inorganic peroxide, an enzyme, and one or more anhydrous salts selected from the group consisting of anhydrous sodium citrate, anhydrous magnesium sulfate, anhydrous calcium chloride and anhydrous zinc sulfate.

7 Claims, No Drawings

ENZYME-CONTAINING BLEACHING COMPOSITION

FIELD OF THE INVENTION

The present invention relates to a bleaching composition containing an enzyme. More particularly, the present invention relates to a stable, enzyme-containing, bleaching composition that contains one or more specific salts and an inorganic peroxide, in addition to the enzyme.

Inorganic peroxides are widely used as bleaching agents for bleaching stains of various dyes. Inorganic peroxides generally exhibit excellent bleaching effects on stains, particularly at high temperatures. However, stains are composed not only of dyestuffs but also of mixtures of dyestuffs with oils, fats, proteins, hydrocarbons, and similar substances. When such stain mixtures are bleached at a high temperature, the additional substances, particularly the proteins, are denatured and the bleaching effects are thereby reduced in many cases. In order to overcome this defect, a process has been employed wherein the inorganic peroxide is used together with an enzyme which removes the protein stains, thereby bleaching the material. It is preferred by users that the inorganic peroxide and the enzyme be contained in one and the same composition because compositions of this type can be used more easily. However, in compositions of this type that contain both components, the enzyme decomposes quite easily and it is quite difficult to store the composition and have it remain stable for a long period of time.

Various processes for improving the stability of compositions containing both an inorganic peroxide and an enzyme have been proposed. For example, a process has been proposed wherein the inorganic peroxide or enzyme is coated with a macromolecular or polymeric substance. However, if the inorganic peroxide or enzyme is completely coated according to the conventional method, either the speed of dissolution of the peroxide or enzyme is greatly lowered, or the cost of the process is disadvantageously increased.

After intensive investigation aimed at solving these problems, the present inventors have discovered that an enzyme-containing, bleaching composition having both high solubility and storage stability can be obtained by incorporating one or a mixture of two or more specific salts in a bleaching composition that contains both an inorganic peroxide and an enzyme. The present invention has been completed on the basis of this discovery.

The salt used in the present invention is a compound or a mixture of two or more compounds selected from the group consisting of anhydrous sodium citrate, anhydrous magnesium sulfate, anhydrous calcium chloride and anhydrous zinc sulfate. The total amount of the salt component contained in the enzyme-containing bleaching composition is 0.1–20 wt. %, preferably 0.5–15 wt. %, based on the total weight of the bleaching composition. If the amount of salt present is less than 0.1 wt. %, no increase in stability of the enzyme-containing, bleaching composition can be obtained, and if the salt content is more than 20 wt. %, the stabilizing effect is not further enhanced and, therefore, such an excess of the salt is undesirable. Among the specific salts of this group, anhydrous sodium citrate and anhydrous magnesium sulfate display particularly excellent stabilizing effects.

Although the mechanism of the stabilizing effects exerted by the above specific anhydrous salts is not yet clear, it is known that not all anhydrous salts display stabilizing effects as the salts of the present invention do. In particular, other compounds capable of having water of crystallization, such as anhydrous sodium carbonate, anhydrous sodium tripolyphosphate, anhydrous sodium pyrophosphate, anhydrous trisodium phosphate, anhydrous sodium metasilicate and anhydrous sodium nitrilotriacetate, do not exhibit the stabilizing effects achieved by the present invention at all.

Conventional inorganic peroxide fabric bleaching agents can be used in the present invention. More particularly, there can be used, for example, sodium percarbonate ($Na_2CO_3.3/2H_2O_2$), sodium sulfate/sodium chloride/hydrogen peroxide adduct ($4Na_2SO_4.2H_2O_2.NaCl$), sodium tripolyphosphate peroxide ($Na_5P_3O_{10}.H_2O_2$), or sodium perborate ($NaBO_3.4H_2O_2$). The water content of these inorganic peroxides is preferably less than 2 wt. % but is not necessarily so limited. The inorganic peroxide is contained in the enzyme-containing, bleaching composition in an amount of 5–98 wt. %, preferably 20–85 wt. %.

The enzymes that can be used in the present invention include hydrolase, transferase, oxide-reductase, lyase, isomerase and ligase. The use of protease, lipase, cellulase or amylase, alone or in mixtures of two or more of them, is particularly preferred. Animals, bacteria and vegetables which produce enzymes or digestive enzymes such as pepsin, pancreatin, papain, catalase and diastase can be used as sources for the enzymes used in the present invention. In particular, enzymes produced by bacteria and molds, such as *Bacillus subtilis* and *Streptomyces griseus*, are preferred. Many commercially available enzymes are produced by molds and bacteria and they are usable in the present invention. Enzymes operational at an optimum effective temperature in the range of 10°–80° C., preferably 20°–60° C., and an optimum effective pH in the range of 4–12, preferably 7–11, are particularly suitable for use in the present invention.

Commercially available enzymes can be used in the present invention.

As amylase enzymes, the following amylase preparations are commercially available and can be used in the present invention:
α-Amylase: Midwest Biochemical Co. (U.S.A.)
α-Amylase: Nagase Sangyo Co.
α-Amylase: Wallerstein Co. (U.S.A.)
Amylase Preparation: Rohm & Haas Co.
Bacterial α-amylase A, BAN: Novo Industry Co.
Bioclastase: Daiwa Kasei K.K.
Clarase: Miles Laboratories Inc.
Fungamil: Novo Industry Co.
Maxazym FA: Gist-Brocades N.V.
Speedase: Nagase Sangyo Co.
Termamyl: Novo Industry Co.

As protease enzymes, the following protease preparations are commercially available and can be used in the present invention:
Alcalase: Novo Industry Co.
Alkaline protease: Takeda Kagaku Kogyo Kabushiki Kaisha
Bioplase: Nagase Sangyo Co.
Esperase: Novo Industry Co.
Matsulase: Matsutani Kagaku Kogyo Kaisha Co.
Maxatase: Gist-Brocades N.V.
Pronase: Kaken Kagaku K.K.
Protin: Daiwa Kasei K.K.

The above preparations are given only as examples, and other enzyme products can also be used. Among the above enzymes, protease enzymes are the most suitable.

The enzyme used in the present invention is preferably used in the form of granules having a size of 0.1-2 mm. The enzyme is contained in the bleaching composition in an amount of 0.01-5 wt. % (preferably 0.1-5 wt. %).

The enzyme-containing, bleaching composition of the present invention can contain conventional components of fabric bleaching compositions, if desired, in addition to the critical components set forth above. As such components, there can be mentioned, for example, inorganic and organic builders such as sodium tripolyphosphate, sodium carbonate, sodium pyrophosphate, sodium sulfate, sodium borate, sodium hydrogencarbonate, sodium silicate, sodium nitrilotriacetate and sodium ethylenediamine tetraacetate; surfactants such as anionic surfactants and nonionic surfactants for cleaning fabrics; macromolecular compounds such as carboxymethyl cellulose, polyvinyl alcohol, polyethylene glycol, sodium polyacrylate and hydrolyzate of vinyl acetate-maleic acid anhydride copolymer; perfumes, pigments, fluorescent dyes and activating agents. All of these compounds can be used together in a detergent composition, singly or in combination.

The following examples illustrate the present invention but do not limit the scope of the invention.

EXAMPLE 1

A mixture of 50 wt. % sodium percarbonate (available oxygen content: 13.8 wt. %, water content: 0.6 wt. %), 2 wt. % protease (Alcalase 2M; a product of Novo Co., Denmark), 38 wt. % anhydrous sodium carbonate and 10 wt. % of an additive, as listed in Table 1, was charged into a plastic vessel, which was then tightly closed. After being stored at 50° C. for 20 days, the percentage of remaining available oxygen (based in the starting available oxygen content) and the percentage of remaining enzyme activity (based on the starting enzyme activity) were determined according to the potassium iodide-thiosulfate method and the trinitrobenzenesulfonic acid salt method. The results are shown in Table 1.

TABLE 1

| Additive | Residual Available Oxygen (%) | Residual Enzyme Activity (%) |
|---|---|---|
| Anhydrous sodium citrate | 93 | 65 |
| Anhydrous calcium chloride | 93 | 60 |
| Anhydrous magnesium sulfate | 92 | 64 |
| Anhydrous zinc sulfate | 93 | 59 |
| Sodium citrate dihydrate | 93 | 18 |
| Calcium chloride hexahydrate | 82 | 20 |
| Magnesium sulfate heptahydrate | 88 | 21 |
| Zinc sulfate heptahydrate | 80 | 16 |
| Anhydrous sodium sulfate | 92 | 22 |
| Anhydrous sodium carbonate | 93 | 20 |
| Anhydrous sodium tripolyphosphate | 93 | 20 |
| Anhydrous sodium pyrophosphate | 93 | 19 |
| Anhydrous sodium metasilicate | 89 | 16 |
| Anhydrous sodium nitrilotriacetate | 92 | 23 |
| Anhydrous calcium sulfate | 92 | 24 |
| Silica gel | 93 | 32 |

EXAMPLE 2

Enzyme-containing, bleaching compositions (a), according to the invention, and (b), a comparison, were prepared according to the following procedure. Ingredient A contained in comparative composition (b) was prepared as follows. 80 parts by weight of polyethylene glycol (molecular weight: 6,000) were heated to 70° C. and melted. 20 parts by weight of Esperase (a protease of Novo Co., Denmark) were added to the liquid polyethylene glycol, and the composition was mixed. The mixture was granulated by means of an extrusion granulation device (Eckpelleter EX-D60, a product of Fuji Powder Kabushiki Kaisha) using a 2 mm $\phi$ screen. The enzyme-containing bleaching compositions (a) and (b) were then prepared according to the procedure described in Example 1.

| | (a) Present Invention | (b) Comparative Composition |
|---|---|---|
| Sodium percarbonate | 50 wt. % | 50 wt. % |
| Anhydrous Glauber's salt | 30 | 40 |
| Polyethylene glycol (molecular weight: 6,000) | 8 | — |
| Esperase | 2 | — |
| Ingredient A | — | 10 |
| Anhydrous sodium citrate | 10 | — |

The two enzyme-containing, bleaching compositions (a) and (b) obtained by the procedures described above were stored at 40° C. for 60 days. The enzyme activities, after storage, of composition (a), according to the invention, and comparative composition (b) were found to be 73% and 28%, respectively.

EXAMPLE 3

| Enzyme-containing bleaching composition: | |
|---|---|
| Sodium percarbonate | 80 wt. % |
| Alcalase 2M | 1 wt. % |
| Glauber's salt | Balance |
| Anhydrous sodium citrate | (see Table 2) |

Compositions of the above formulations prepared according to the procedure of Example 1 were stored at 50° C. for 20 days and the remaining enzyme activity was then measured for each composition. The results are shown in Table 2.

TABLE 2

| Anhydrous sodium citrate (wt. %) | Remaining enzyme activity rate (%) |
|---|---|
| 0 | 20.3 |
| 0.01 | 28.1 |
| 0.1 | 35.3 |
| 0.5 | 53.0 |
| 1 | 60.2 |
| 3 | 63.4 |
| 5 | 62.8 |
| 10 | 65.3 |
| 19 | 64.2 |

The embodiments of the invention in which an exclusive property or privilege is claimed are defined as follows:

1. A dry, powder, enzyme-containing, bleaching composition comprising from 5 to 98 percent by weight of an inorganic peroxide effective for bleaching fabrics; from 0.01 to 5 percent by weight of one or more enzymes capable of functioning in a bleaching composition for the removal of organic stains from fabrics; and from 0.1 to 20 percent by weight of at least one anhydrous salt selected from the group consisting of anhydrous sodium citrate, anhydrous magnesium sulfate, anhydrous calcium chloride and anhydrous zinc sulfate.

2. A dry, powder, enzyme-containing, bleaching composition according to claim 1 wherein the enzymes are selected from the group consisting of hydrolase, transferase, oxide-reductase, lyase, isomerase, ligase, protease, lipase, cellulase and amylase.

3. A dry, powder, enzyme-containing, bleaching composition according to claim 1 wherein the enzymes have an optimum temperature in the range of 10°–80° C. and an optimum pH in the range of 4–12.

4. A dry, powder, enzyme-containing, bleaching composition according to claim 1 wherein the inorganic peroxide has a water content of less than 2 wt. %.

5. A dry, powder, enzyme-containing, bleaching composition according to claim 4 wherein the enzymes are in the form of granules having a particle size 0.1–2.0 mm.

6. A dry, powder, enzyme-containing, bleaching composition according to claim 1, consisting essentially of from 20 to 85 percent by weight of said inorganic peroxide, from 0.1 to 5 percent by weight of said enzyme and from 0.5 to 15 percent by weight of said anhydrous salt.

7. A dry, powder, enzyme-containing, bleaching composition according to claim 6 in which said enzyme is selected from the group consisting of protease, lipase, cellulase, amylase and mixtures thereof.

* * * * *